United States Patent [19]

White

[11] Patent Number: 4,686,524

[45] Date of Patent: Aug. 11, 1987

[54] PHOTOSENSITIVE ELECTROPHORETIC DISPLAYS

[75] Inventor: Roger P. White, Yonkers, N.Y.

[73] Assignee: North American Philips Corporation, New York, N.Y.

[21] Appl. No.: 795,005

[22] Filed: Nov. 4, 1985

[51] Int. Cl.⁴ .......................... G02F 1/01; G09G 3/34
[52] U.S. Cl. .................................. 340/787; 340/783; 340/794; 350/362
[58] Field of Search ...................... 340/783, 787, 794; 350/362

[56] References Cited

U.S. PATENT DOCUMENTS

| | | | |
|---|---|---|---|
| 3,967,265 | 6/1976 | Jacob | 340/794 |
| 4,187,160 | 2/1980 | Zimmerman | 340/787 |
| 4,203,106 | 5/1980 | Dalisa et al. | 340/787 |
| 4,418,346 | 11/1983 | Batchelder | 340/787 |
| 4,522,472 | 6/1985 | Liebert et al. | 340/787 |

Primary Examiner—Howard A. Birmiel
Attorney, Agent, or Firm—Paul R. Miller

[57] ABSTRACT

A photosensitive electrophoretic display device is described which provides real time imaging without a reset cycle. This display device operates by the use of interdigitized electrodes at an addressing side of the display on which a photoconductor material having a varying resistance according to light exposure is provided in order to vary the electric field across the electrophoretic suspension. This enables movement of electrophoretic particles according to application of the proper voltages and light exposures.

5 Claims, 15 Drawing Figures

PHOTOSENSITIVE ELECTROPHORETIC DISPLAYS

The present invention is directed to the construction of photosensitive electrophoretic image displays that provide real time imaging without requiring a reset cycle.

Typical photosensitive type electrophoretic image displays are the "snap-shot" type devices in which a reset cycle is always necessary after exposure and development of the image. The reset cycle returns pigment from one electrode to the other so that a blanking of the display is caused. A significant difficulty with this reset cycle is that real time imaging is impossible. Further, the reset cycle is distracting to the observer when the viewing of a rapid succession of images is attempted, i.e. pseudo real time imaging.

The present invention provides a photosensitive electrophoretic image display in which real time viewing is provided without a reset cycle so that information will not be lost from the display. In such structures, a memory operation may be present if desired.

The structure and advantages of the present invention may be seen by reference to the drawing figures which illustrate, without limitation, various features of the present invention, and wherein.

Figure 7A:
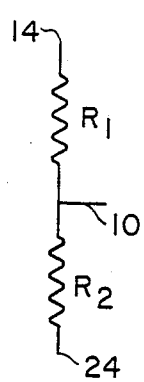
Figure 7B:
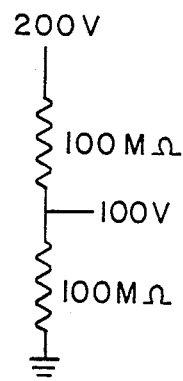
Figure 7C:
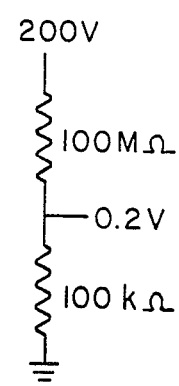
Figure 8:
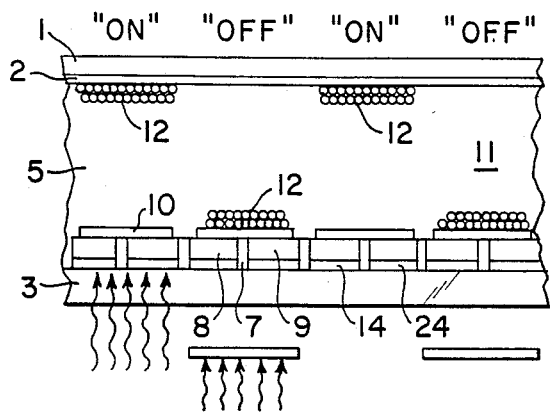
Figure 9:
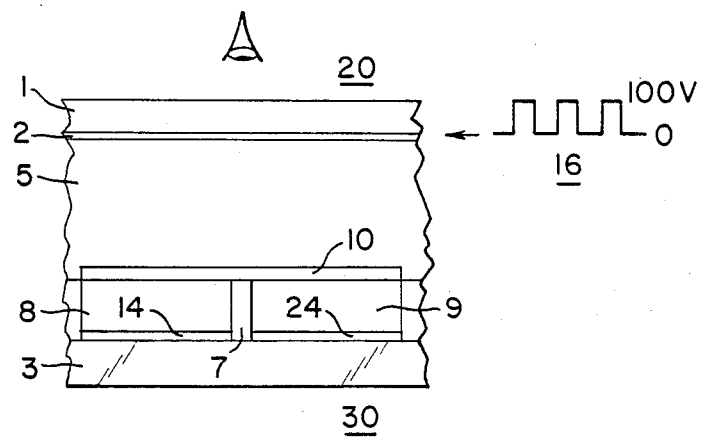
Figure 10:
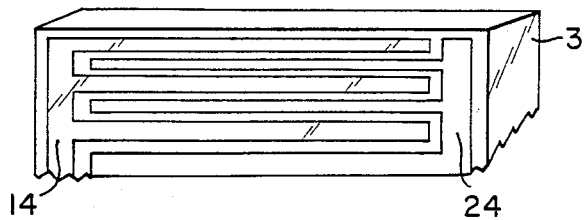
Figure 11:
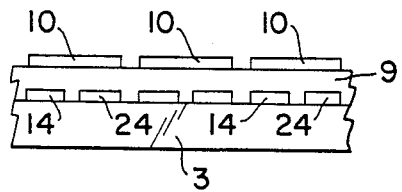
Figure 12:
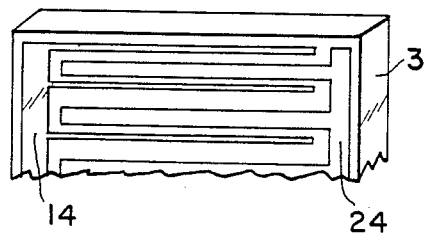
Figure 13:
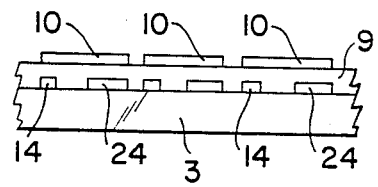

FIGS 7A, 7B, and 7C illustrate various electrical operations of the present invention;

FIG. 8 illustrates in cross-sectional view the operation of the present invention;

FIG. 9 illustrates one modification of the structure according to the present invention;

FIG. 10 illustrates another arrangement of the rear electrode structure according to the present invention;

FIG. 11 illustrates a partial cross-sectional view of the features of FIG. 10;

FIG. 12 illustrates a further arrangement of the rear electrode structure according to the present invention; and FIG. 13 illustrates a partial cross-sectional view of the features of FIG. 12.

Figure 1:
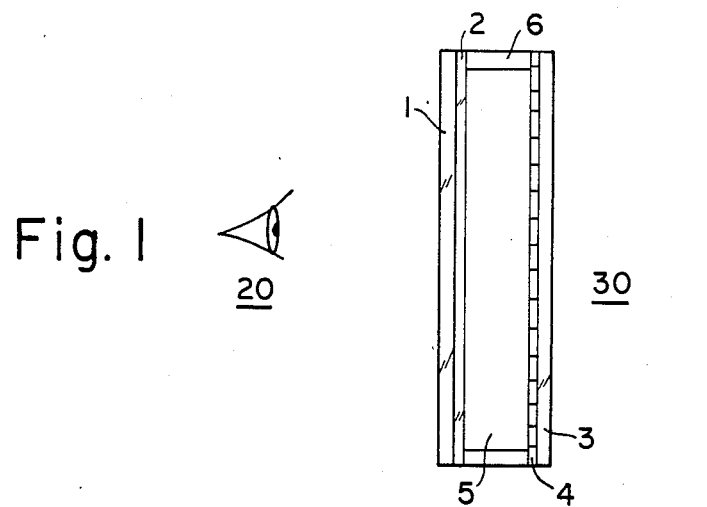
FIG. 1 shows in cross-section a photosensitive electrophoretic image display device according to the present invention.

The drawing figures illustrate the structure, construction and operation of the present invention in which similar parts are provided with the same reference numerals. In FIG. 1 the electrophoretic display of the present invention is illustrated in which information is addressed to one side 30 of the display device, while the display is viewed at a viewing side 20. The display has the structure of a front panel 1 of a transparent material such as glass, a transparent electrode 2, such as indium oxide, a rear substrate 3, a rear electrode structure 4, an electrophoretic suspension 5 formed between the electrodes 2 and 4, and a spacer 6 separating the two sides 1 and 3.

Figure 2:
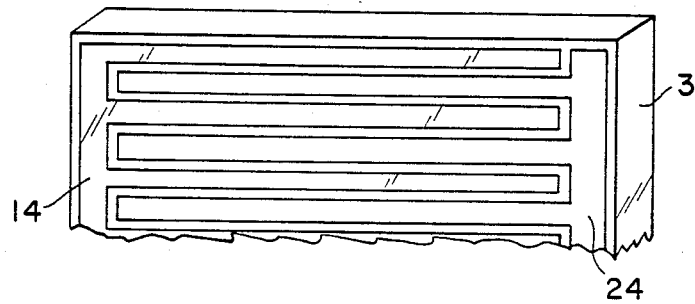
FIG. 2 illustrates one side of this structure.

In accordance with the present invention, the rear electrode structure is provided, as seen in FIG. 2, by two sets of interdigitized electrodes 14 and 24. These electrodes are formed on the rear substrate 3 in facing relationship to the electrophoretic suspension 5, and at least one set of the electrodes may be transparent while the substrate 3 is also transparent. The electrodes 14 and 24 may be fabricated by etching a transparent conductor such as indium oxide, or by depositing conductor material in a silk screening technique.

Figure 3:
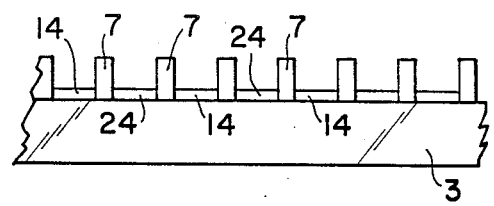
FIG. 3 illustrates a first step in the construction of this device.

The rear electrode structure is made by depositing electrical insulator strips 7 on the rear substrate 3 with the insulator strips 7 being deposited between the interdigitized electrodes 14 and 24. This is shown in FIG. 3.

Figure 4:
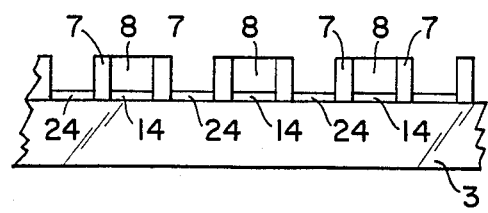
FIG. 4 illustrates a further step in construction of this device.
Figure 5:
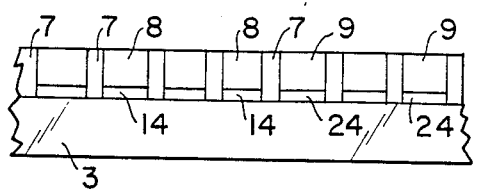
FIG. 5 illustrates another step in construction of this device.
Figure 6:
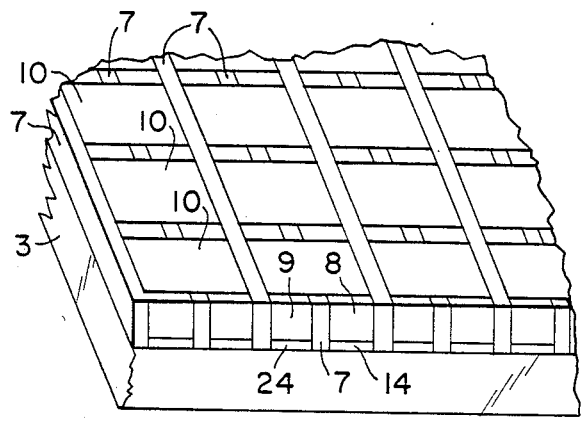
FIG. 6 illustrates a perspective view of the completed structure at one side of the display device.

Next, as shown in FIG. 4, a resistor material 8, such as a cermet of carbon in a polymer base, is deposited on one set of electrodes, such as electrodes 14. Then, as shown in FIG. 5, a photoconductor material 9, such as cadmium sulfide or cadmium selenide, is deposited on the other set of electrodes 24. Finally, a set of conductive pixel pads 10, or electrode pads, are deposited over combinations of resistor 8 and photoconductor 9, as seen in FIG. 6. It is beneficial that the insulator 7, resistor material 8, and photoconductor material 9, all extend to the same height from the surface of the substrate 3.

The front electrode 2 on the viewing side 20 of the device, seen in FIG. 1, may be a single transparent electrode covering the entire transparent substrate 1. This electrode 2 covers the same area as the total rear electrode structure of interdigitized electrodes 14 and 24, together with the pixel pads 10.

In operation a single pixel pad 10 may be considered by reference to FIG. 7. The dimensions of the resistance material 8 are made so that the resistance $R_1$ from front to back is approximately 100 megohms. The dimensions of the photoconductor 9 are such that the dark front to back resistance $R_2$ is also approximately 100 megohms. The photoconductor material 9 may have a dark to light resistance ratio of 1,000 to 1.

The resistances $R_1$ and $R_2$ may form a voltage divider with the pixel pad at a common node, such as illustrated in FIG. 7A. If 200 volts are applied to the electrode 14, and the electrode 24 is fixed at ground potential, the voltage at the pixel pad 10 is 100 volts when the pixel is in the dark, as seen in FIG. 7B. If a voltage of approximately 50 volts is applied to the viewing electrode 2, the pixel pad 10 is 50 volts more positive than the viewing electrode 2. Assuming negatively charged pigment particles in the electrophoretic suspension 5, the pigment particles will be attracted to this pixel pad 10 and the color of the dye will be viewed at the viewing side 20. If light is applied to the photoconductor at the pixel in question, its resistance is lowered by a factor of 1,000 to a value of 100 kiloohms, and the voltage at the adjacent pixel pad is 0.2 volts, such as seen in FIG. 7C, or essentially ground.

This pixel pad is now approximately 50 volts more negative than the front electrode, and the color of the pigment migrates to the front electrode 2 side of the display so that the color of the pigment is seen on the viewing side 20. When the light is removed, the pixel returns to its previous state, such as seen in FIG. 7B, and the color of the dye is again seen at the viewing side 20 of the display.

If memory operation is required, it is only necessary to remove the voltages from the electrodes. When this is accomplished, the pigment particles will remain at their last position. The entire array may be erased, if required, by placing all the rear electrodes at the same potential either more positive or more negative than the front electrode. For example, if the rear electrodes are made more positive than the front electrode, assuming negative pigment, then all the pigment will move to the rear electrodes, and the information will be erased. The observer will then see the color of the dye. This construction can then be made to operate with the advantage that it will work as a real time display. Resolution is dependent upon the pixel size which is dependent upon geometry of the display.

On an individual pixel basis, the electrophoretic solution 11 has pigment 12, as seen in FIG. 8, in the suspension 5 which pigment resides either on the front electrode 2 or the rearward pixel pads 10 depending on the voltage on the pixel pad (determined by the resistance of the photoconductor), and the polarity of the pigment. In this arrangement, each pixel pad 10 would either be entirely on or entirely off, as may be seen by the various "ON" and "OFF" regions of the display in FIG. 8. An application of this type of device could be to a data terminal where information is read into the device with a laser, for example. The display device discussed above with FIGS. 1–8 operates in a binary mode without a gray scale.

In addition, an operation which provides a gray scale may be seen. In this type of operation, the resistance of the photoconductor is proportional to the amount of light impinging upon it, and therefore, the voltage on the pixel pad will vary with the amount of light applied.

Since the transit time of the pigment 12 in the electrophoretic suspension 5 is directly proportional to the amount of voltage applied across the electrodes, or across the device, the distance that the pigment travels in a given amount of time is dependent upon the amount of light on the photoconductor. Therefore, using a time-of-flight technique, if the device is to be open circuited after a given amount of time, the pigment will have traveled a given distance across the device, and will be seen in varying degrees depending upon the distance it has traveled from the front electrode, as well as the opacity of the dye in the suspension 5. This will provide a gray scale. However, in this arrangement, the device would have to be reset or erased after each exposure in the same manner that a prior art "snap-shot" device is operated since the exposure would accumulate if the information did not change and the pixel pad would soon be entirely on.

A better mode of operation according to the present invention, provides real time gray scale operation with no reset or erase required. By reference to FIG. 9 which is a cross-sectional view of one pixel pad area, a square wave voltage 16 which alternates between 0 and 100 volts at 60 Hz, for example, is applied to the front electrode 2. At the opposite side of the display cell, the electrodes 14 are provided at ground potential, while the electrodes 24 are at +200 volts. In the dark, assuming that the resistances of the photoconductor material 9 and resistor material 8 are equal, the pixel pad 10 will be at +100 volts. Again assuming negatively charged pigment particles, the pigment particles will reside on the pixel pad and an observer will see the color of the dye at the viewing side indicating a full off condition.

When sufficient light is applied to the rear electrode at the addressing side 30 of the device, the resistance of the photoconductor 9 is lowered by a factor of 1,000, for example, so that the voltage at the pixel pad 10 will be at approximately ground potential. Then the pigment particles will move to and reside on the front electrode 2 and the viewer will see the color of the pigment in a full "ON" condition. By varying the amount of light on the photoconductor, the voltage on the pixel pad will vary and the brightness seen by the observer can be varied at any point between full "ON" and full "OFF". Consequently, a gray scale is provided by this dynamic time-of-flight operation to vary observation between full "ON" and full "OFF".

Several alternative constructions of the rear electrode structures may be seen, such as by way of FIGS. 10 and 11. FIG. 10 illustrates the interdigitized electrodes 14 and 24 on the rear substrate 3 similar to that shown in FIG. 2 above.

In the structure of FIG. 10, however, one set of electrodes 14 may be transparent, such as of indium oxide, while the other set of electrodes 24 may be opaque, such as aluminum. The entire surface of the substrate 3 is now covered with the photoconductor 9, as seen in FIG. 11, and various pixel pads 10 are applied as before. In this case, the photoconductor 9 behind the opaque electrode is now simply a resistor since light cannot impinge upon it. It is therefore no longer necessary to apply alternating stripes of photoconductor and resistor materials, as before. In addition, the matching of the resistance is now automatic since one homogeneous material is utilized. The insulators 7, such as in FIG. 3 above, may or may not be used.

A further alternative arrangement is shown in FIGS. 12 and 13. In this construction, both electrodes 14 and 24 are made of an opaque material, such as aluminum. However, the width of one set of the interdigitized electrodes 14 is considerably narrower than the other set of electrodes 24. This greatly simplifies the construction of electrodes since only one deposition and a subsequent etching operation is required. A photoconductor 9 is applied over the entire surface, as above, and is followed by fabrication of the pixel pads 10. The narrow electrodes 14 now have the effect of transparent electrodes since there is a large transparent area between the electrodes as seen in FIG. 13.

This structure has been found to be quite valuable in the formation of X-ray sensitive electrophoretic fluoroscopic devices. If a photosensitive electrophoretic display is made with a material that changes its resistance upon application of X-radiation, a real time, flat screen detector-viewer can be realized as a real time electrophoretic display type fluoroscope. Such a fluoroscope operates on the principle of a gray scale in the color viewed in the display device.

In such an arrangement, an X-ray sensitive layer can be provided at least in proximity to the photoconductor layer 9. Alternatively, the photoconductor layer 9 itself can be X-ray sensitive.

What I claim:

1. A photosensitive electrophoretic display device comprising a first transparent substrate having a transparent electrode thereon, an electrophoretic suspension, and a transparent substrate having a second electrode structure formed in facing relationship to the electrophoretic suspension, wherein the second electrode structure comprises at least two interdigitized electrodes, a photosensitive material, and a plurality of conductors covering at least a portion of each of said at least two electrodes.

2. A photosensitive electrophoretic display device according to claim 1, wherein a resistor material covers one of said two interdigitized electrodes, and said photosensitive material covers the other of said two electrodes.

3. A photosensitive electrophoretic display device according to claim 2, wherein insulator strips separate said resistor material and said photosensitive material.

4. A photosensitive electrophoretic display device according to claim 1 or claim 2, wherein said plurality of conductors includes a plurality of conductive pads, each of said pads covering at least a portion of said photosensitive material and a common portion of said two electrodes.

5. A photosensitive electrophoretic display device according to claim 1, wherein an X-ray sensitive layer is provided at least relative to said photosensitive material.

* * * * *